(12) United States Patent
Muukki (10) Patent No.: US 10,999,568 B2
(45) Date of Patent: May 4, 2021

(54) METHOD AND APPARATUS FOR 3D CAPTURE SYNCHRONIZATION

(71) Applicant: Nokia Technologies Oy, Espoo (FI)

(72) Inventor: Mikko Muukki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/042,394

(22) Filed: Jul. 23, 2018

(65) Prior Publication Data

US 2018/0332272 A1 Nov. 15, 2018

Related U.S. Application Data (63) Continuation of application No. 15/208,670, filed on Jul. 13, 2016, now Pat. No. 10,063,839, which is a continuation of application No. 13/991,198, filed as application No. PCT/FI2010/051011 on Dec. 13, 2010.

(51) Int. Cl.
| | | |
|---|---|---|
| *H04N 13/00* | (2018.01) | |
| *H04N 13/239* | (2018.01) | |
| *H04N 13/296* | (2018.01) | |
| *G06F 13/42* | (2006.01) | |
| *G06F 13/10* | (2006.01) | |
| *H04N 5/247* | (2006.01) | |

(52) U.S. Cl.
CPC ......... *H04N 13/239* (2018.05); *G06F 13/102* (2013.01); *G06F 13/4282* (2013.01); *G06F 13/4291* (2013.01); *H04N 5/247* (2013.01); *H04N 13/296* (2018.05); *G06F 2213/0016* (2013.01)

(58) Field of Classification Search
CPC ............. H04N 13/0239; G06F 13/102; G06F 13/4282
USPC .......................................................... 348/47
See application file for complete search history.

(56) References Cited

U.S. PATENT DOCUMENTS

| | | | |
|---|---|---|---|
| 5,280,281 A | | 1/1994 | Shimotsuma |
| 5,293,604 A | * | 3/1994 | Kadaira ............... G06F 15/167 711/5 |
| 5,377,325 A | | 12/1994 | Chan |
| 6,118,461 A | | 9/2000 | Taylor |
| 6,629,172 B1 | | 9/2003 | Andersson et al. |
| 6,745,270 B1 | | 6/2004 | Barenys et al. |

(Continued)

FOREIGN PATENT DOCUMENTS

| | | |
|---|---|---|
| CN | 1215196 A | 4/1999 |
| CN | 1403932 A | 3/2003 |

(Continued)

OTHER PUBLICATIONS

Office action received for corresponding Korean Patent Application No. 2013-7018150, dated Jun. 29, 2015, 3 pages of office action and no page of office action translation available.

(Continued)

*Primary Examiner* — Jeffery A Williams
(74) *Attorney, Agent, or Firm* — Harrington & Smith (57) ABSTRACT

In accordance with an example embodiment of the present invention, disclosed is a method and an apparatus thereof for receiving a first command via a first interface that is addressable by a first address and receiving a second command via a second interface that is addressable by a second address.

27 Claims, 5 Drawing Sheets

(56) References Cited

U.S. PATENT DOCUMENTS

| | | | |
|---|---|---|---|
| 6,799,106 B2 | 9/2004 | Fukushima et al. | |
| 6,864,911 B1 | 3/2005 | Zhang et al. | |
| 6,950,121 B2 | 9/2005 | Tserkovnyuk et al. | |
| 7,085,863 B2 | 8/2006 | Barenys et al. | |
| 7,249,209 B2 | 7/2007 | Yang | |
| 7,388,598 B2 | 6/2008 | Lee et al. | |
| 7,444,453 B2 | 10/2008 | Ellison | |
| 7,511,737 B2 | 3/2009 | Singh | |
| 7,619,683 B2 | 11/2009 | Davis | |
| 7,685,320 B1 | 3/2010 | Wishneusky | |
| 7,694,050 B1 | 4/2010 | Chan et al. | |
| 7,716,379 B2 * | 5/2010 | Ruan | G06F 13/387 709/224 |
| 8,421,846 B2 | 4/2013 | Nelson et al. | |
| 2003/0149824 A1 * | 8/2003 | Smith | G06F 13/4291 710/305 |
| 2004/0230709 A1 * | 11/2004 | Moll | G06F 13/4022 710/1 |
| 2005/0174473 A1 | 8/2005 | Morgan et al. | |
| 2005/0280702 A1 | 12/2005 | Nakano et al. | |
| 2006/0123168 A1 | 6/2006 | Lang | |
| 2006/0136608 A1 | 6/2006 | Gilbert | |
| 2007/0085903 A1 | 4/2007 | Zhang | |
| 2009/0163185 A1 | 6/2009 | Lim et al. | |
| 2009/0315899 A1 | 12/2009 | Pourbigharaz et al. | |
| 2009/0316724 A1 | 12/2009 | Muukki | |
| 2010/0157020 A1 | 6/2010 | Choi et al. | |
| 2010/0225744 A1 | 9/2010 | Tomizawa et al. | |

FOREIGN PATENT DOCUMENTS

| | | | |
|---|---|---|---|
| CN | 1987553 A | 6/2007 | |
| CN | 101101531 A | 1/2008 | |
| CN | 101257640 A | 9/2008 | |
| EP | 0893767 A2 | 1/1999 | |
| EP | 1209558 B1 | 5/2002 | |
| EP | 1639405 A2 | 3/2006 | |
| EP | 1969423 A2 | 9/2008 | |
| EP | 1422628 B1 | 10/2009 | |
| EP | 2153641 B1 | 2/2010 | |
| EP | 2285133 A2 | 2/2011 | |
| JP | 2000-286872 A | 10/2000 | |
| JP | 2005039409 A | 2/2005 | |
| JP | 2009110662 A | 5/2009 | |
| KR | 2008-0073073 A | 8/2008 | |
| KR | 2009-0084465 A | 8/2009 | |
| TW | 201039048 A | 11/2010 | |
| WO | WO-01/29649 A1 | 4/2001 | |
| WO | 2012/080556 A1 | 6/2012 | |

OTHER PUBLICATIONS

Office action received for corresponding Chinese Patent Application No. 201080070630.6, dated Nov. 13, 2015, 5 pages of office action and 3 pages of office action translation available.

IS42S16100E—Integrated Silicon Solution, Inc.

Litos et al., "Sunchronous image acquisition based on network synchronization", IEEE Conference on Computer Vision and Pattern Recognition Workshop, 2006. CVPRW06.

International Search Report and Written Opinion received for corresponding Patent Cooperation Treaty Application No. PCT/FI2010/051011, dated Sep. 21, 2011, 11 pages.

"The I2C-Bus Specification", Philips Semiconductors, Version 2.1, Jan. 2000, pp. 1-46.

"MIPI Alliance Standard for Camera Serial Interface 2 (CSI-2)", MIPI, Version 1.00, Nov. 29, 2005, 124 pages.

Office action received for corresponding Korean Patent Application No. 2013-7018150, dated Dec. 15, 2014, 5 pages of office action and no English Office Action Translation available.

Office action received for corresponding Chinese Patent Application No. 201080070630.6, dated Mar. 2, 2015, 6 pages of office action and 3 pages of office action translation available.

* cited by examiner

| | 1st Camera module | address | 2nd Camera module | address |
|---|---|---|---|---|
| 1 | Power up camera modules | | | |
| 2 | Wake up by turning EXTCLK on | | HW standby | |
| 3 | CCI address is changed by CCI_address_control register (address changed to e.g. 0x22) | 0x20 | | |
| 4 | | | Wake up by turning EXTCLK on | |
| 5 | Identification and NVM read | 0x23 | | |
| 6 | Initialization | 0x22 | | |
| 7 | | | Identification and NVM read | 0x21 |
| 8 | | | Initialization | 0x20 |
| 9 | Secondary CCI interface is activated by 2nd_CCI_if_ctrl register. Enable ACK assertion for 2nd interface activated by 2nd_CCI_if_ctrl register. | 0x22 | | |
| 10 | | | Secondary CCI interface is activated by 2nd_CCI_if_ctrl register. ACK assertion is not enabled for 2nd interface (default value of 2nd_CCI_if_ctrl register). | 0x20 |
| 11 | Send start streaming command to secondary interface 0x30 | | | |
| 12 | Streaming is started for both cameras. Only 1st camera will give ACK. | | | |

Figure 4

|   | 1st Camera module | addr. | 2nd Camera module | addr. |
|---|---|---|---|---|
| 1 | Group parameter hold   0x30 | | | |
| 2 | Change exposure time   0x30 | | | |
| 3 | Change analog gain | 0x22 | | |
| 4 | | | Change analog gain | 0x20 |
| 5 | Release group parameter hold   0x30 | | | |

Figure 5a

|   | 1st Camera module | addr. | 2nd Camera module | addr. |
|---|---|---|---|---|
| 1 | Group parameter hold   0x30 | | | |
| 2 | Change exposure time | 0x22 | | |
| 3 | | | Change exposure time | 0x20 |
| 4 | Change analog gain | 0x22 | | |
| 5 | | | Change analog gain | 0x20 |
| 6 | Release group parameter hold   0x30 | | | |

METHOD AND APPARATUS FOR 3D CAPTURE SYNCHRONIZATION

CROSS-REFERENCE TO RELATED PATENT APPLICATIONS

This patent application is a continuation patent application of copending U.S. patent application Ser. No. 15/208,670, filed Jul. 13, 2016, that is in turn a continuation application of U.S. patent application Ser. No. 13/991,198, filed Aug. 6, 2013, that is in turn a National Stage Entry of PCT/FI2010/051011 having an International Filing Date of Dec. 13, 2010. The disclosures of these prior applications are incorporated by reference herein in their entireties.

TECHNICAL FIELD

The present application relates generally to digital cameras for three-dimensional, 3D, image capture, and more specifically, to methods and apparatuses for synchronization of camera modules for 3D image capture.

BACKGROUND

The lenses of the eyes in a healthy human being project slightly different pictures onto the retinas, which are then transformed, by the brain, into a spatial representation. The actual stereoscopic spatial observation is a result of this perception through both eyes. A stereoscopic display creates a 3D illusion with a pair of 2D images, one for the left eye and the other for the right eye, representing two perspectives of the same object, with a minor deviation similar to the perspectives that both eyes naturally receive in binocular vision. The viewer's brain merges the pair of images and extracts depth information from the slightly different images.

Stereoscopic, or 3D, pictures are produced in pairs, the members of a pair showing the same scene or object from slightly different angles that correspond to the angles of vision of the two eyes of a person looking at the object. Thus, it is necessary to take two photographs for a 3D image. This can be done with two cameras, with one camera moved quickly to two positions, or with a stereo camera configured to obtain two images.

A stereo camera is a type of camera with two or more lenses. The distance between the lenses in a typical stereo camera roughly corresponds to the distance between human eyes. In the 1950s a number of manufacturers introduced stereo cameras that were developed to use 135 film with separate film frame for each lens. Recently, digital stereo cameras (digital 3D compact cameras) have come on the market. In digital 3D cameras there are usually two camera modules, each of them having one lens unit and one image sensor. Lens unit consists of one or more lenses. It is also possible to have 3D camera where single camera module is used with specific 3D lens unit for capturing 3D images. However in those devices the lens unit has typically large physical size.

SUMMARY

Various aspects of examples of the invention are set out in the claims.

According to a first aspect of the present invention, an apparatus is described, which comprises a first interface that is addressable by a first address and a second interface that is addressable by a second address.

In one embodiment of the invention, the first address is a unique address and the second address is shared address, shared with other peripheral devices of the same type connected to the same bus. The first interface addressed with the unique address is configured to receive individual commands and the second interface with the shared address is configured to receive group commands.

According to a second aspect of the present invention, a system is described, which comprises a host device and at least two peripheral devices comprising a first interface that is addressable by a first address, and a second interface that is addressable by the second address.

According to a third aspect of the present invention, a method is provided for receiving a first command via a first interface addressable by a first address, and receiving a second command via a second interface addressable by a second address.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention are understood by referring to FIGS. 1 through 6 of the drawings.

In 3D capture, it is crucial to capture both images at substantially the same time; especially when a target is moving or when a background comprises changing or moving objects. In digital 3D cameras with two sensors there are thus strict timing requirements. This relates mainly to camera command timings between two camera modules, as some commands have to be received at the same time or very close to that.

Figure 1:
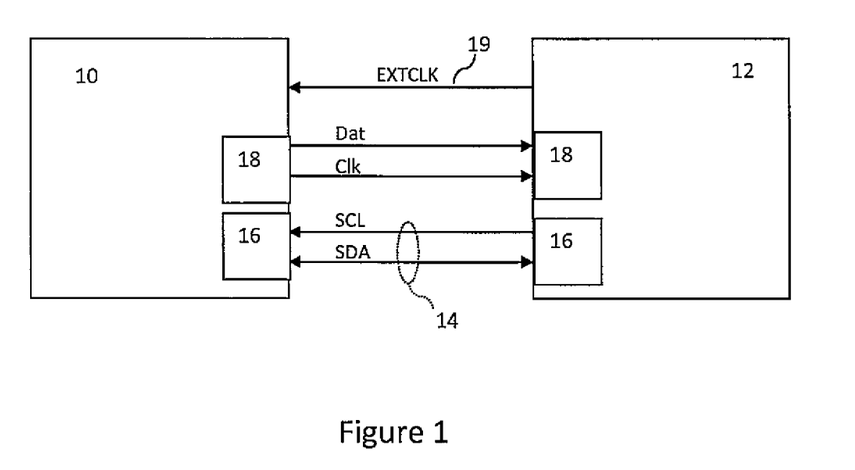
FIG. 1 shows an example of an electrical interface between a camera module and a host device.

FIG. 1 shows an example of an electrical interface between a camera module 10 and a host device 12. The electrical interface comprises data transmission and control interfaces. In the example of FIG. 1, the data transmission interface 18 is a unidirectional interface with data and clock, or strobe, signals. This interface may be for example MIPI CSI-2. This interface is used for transferring image data from camera module 10 to host device 12. The control interface 16 is a bi-directional interface for controlling the camera module 10. Control interface 16 may be a camera control interface, CCI, which may be compatible with an inter-integrated circuit, I²C, bus specification, for example.

Bus 14, which may be for example an I²C-bus or a bus conforming to another standard, physically consists in the illustrated example of two active wires and a ground connection. Two wires, serial data, SDA, and serial clock, SCL, carry information between the devices connected to the bus. Each device connected to the bus may be recognized by a unique address. A master/slave relationship may exist between devices connected to the bus; a master is the device which initiates a data transfer on the bus and generates the clock signals to permit that transfer. At that time, any device addressed is considered a slave.

In the example embodiment illustrated in FIG. 1, host device 12 is considered a master, or transmitter, and camera module 10 is considered a slave, or receiver. In the illustrated example, the CCI 16 is capable of handling several slaves but multi-master mode is not necessarily supported.

Figure 2:
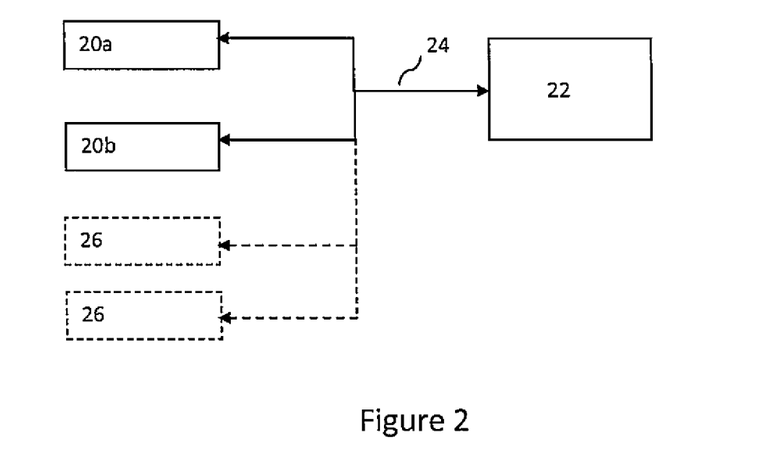
FIG. 2 shows a system comprising a host device and plurality of peripheral devices connected to the host device according to an embodiment of the invention.

FIG. 2 shows a system comprising two peripheral devices (slaves), in this example camera modules 20a and 20b, connected to the host device 22 (master) via the bus 24, according to an embodiment of the invention. Although in 3D capture only two camera modules are required, it is possible to connect further camera modules or other (slave) devices 26 to the same bus 24 as illustrated in FIG. 2. For simplicity signal lines separate from the bus 14, data, clock/strobe, EXTCLK, shown in FIG. 1, are omitted in FIG. 2.

All active peripheral devices connected to the same bus 24 must have different CCI addresses so that they can be recognized by host device 22. When peripheral devices that are used at the same time are different, for example a camera and an FM-radio, this is not a problem. In case of a 3D camera, however, two similar camera modules 20a and 20b may be connected to the same bus 24. In addition to 3D image capture there exist also other applications utilizing two cameras at the same time such as augmented reality, videos with second camera used to provide a commentary video stream overlayed to a main video stream or second cameras used as an ambient light sensors, etc. Therefore a mechanism for uniquely addressing two camera modules with identical CCI addresses is needed. One possible solution is described next.

Figure 3A:
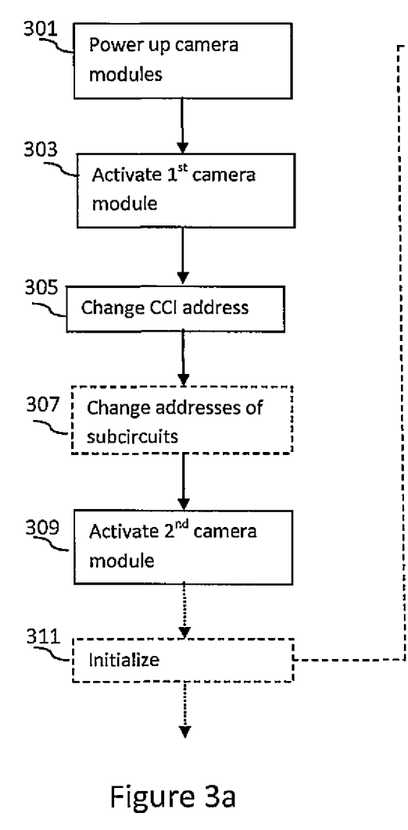
FIG. 3a illustrates an example method for changing a CCI address of a peripheral device.

FIG. 3a illustrates an example method for changing a CCI address of a peripheral device. In a first block 301 camera modules 20a and 20b are powered up by applying voltage to them, however, some voltages may be already present. Initially both camera modules 20a and 20b (and 26 if the system has more than two camera modules) may be configured to have the same CCI address. If host 22 now sent a command with camera module's CCI address to the bus 24, both (or all) camera modules 20a and 20b would receive and acknowledge the command and thus it would not be possible to read camera specific data from the camera modules as both of them would respond simultaneously. Therefore, camera modules 20a and 20b may be activated sequentially instead of activating both (or all) of them together during or after the power up.

In a block 303 a first camera module 20a is activated by turning a camera reference clock signal EXTCLK on. It is noted that both (or all) camera modules 20a and 20b have separate EXTCLK lines 19. When camera module 20a is activated, in the sense that its reference clock signal is on, its address can be changed.

In a block 305, host 22 sends a change address-command to the first camera module 20a. The command is sent to the initial, or default, address, for example 0x20. The address is then changed by writing a new address, for example 0x22, to a register, for example a CCI_address_control register. In case the first camera 20a includes sub-circuits, for example a separate lens driver, also CCI addresses of the sub-circuits may be changed by using a CCI_address_control register of the sub-circuit as shown in an optional block 307. The camera module 20a may be configured to send an acknowledge (ACK) signal (not shown in FIG. 3a) before taking the new address into use or in connection with taking the new address into use. The host 22 may read the CCI_address_control register to make sure that the new address has been taken into use. Optionally, before sending the change address-command host 22 may check from a register, such as a CCI_address_control capability register, that the CCI address of the first camera 20a can be changed. However, the CCI address change may be enabled by default and thus this step is optional and not shown separately in FIG. 3a but optionally included in block 305.

In block 309 the second camera module 20b is activated by turning on its EXTCLK signal. As the first camera module 20a now has a new address (0x22) in use, the second camera module 20b can be commanded using the default, i.e. initial, address, in this example 0x20. However, if there are more than two camera modules connected to the same bus 24 also the address of the second camera module 20b has to be changed using the above procedure. That is, the camera modules 20a, 20b, 26s are activated one by one, and the default address of all but one device is changed so that when the procedure is completed all similar devices have their own unique CCI address.

As shown in an optional block 311, camera modules 20a and 20b can now be initialized. First, non-volatile memory (NVM) information of both (or all) camera modules 20a and 20b may be read using their unique read addresses, for example 0x23 and 0x21, respectively. In this example 0x22 represents a unique write address and 0x23 a unique read address for the first camera module 20a, and correspondingly 0x20 and 0x21 represent unique write and read addresses, respectively, for the second camera module 20b. The camera modules 20a and 20b may then be initialized, for example by applying viewfinder settings. The specifics of the initialization procedure of block 311 depend on the embodiment at hand.

The camera modules 20a and 20b are now ready for use; they can be commanded separately and their settings can be individually adjusted because they both have a different, unique, CCI address. However, to be able to capture 3D images, the host 22 should be able to command both camera modules 20a and 20b to start streaming, or capturing, at the same time. This could be implemented by sending commands, for example to start streaming, to camera modules 20a and 20b sequentially so that camera modules receive the commands at slightly different time instants. This may be problematic in case only a very small difference between exposures is acceptable.

One possible solution would be implementing a dedicated bus for each camera module and sending commands simultaneously to both (each) buses. In this solution camera module to camera module command accuracy depends on host capabilities; bus to bus timing difference may affect the quality of 3D images. Another solution would be assignment of unique CCI address to each connected camera module, for example as described above. In this solution commands to camera modules would be sent sequentially. In this case camera module to camera module delay cannot be zero. Still another solution would be daisy chained connection between camera modules. This solution requires at least one custom camera module.

In one example embodiment of the invention, camera modules 20*a* and 20*b* have a second control interface 67, which will be discussed in detail in connection with FIG. 6. This second interface, illustrated in FIG. 6 as interface 67, is used to receive shared or group commands, that is commands that both (or all) camera modules should receive at the same time. The CCI address of the second interface 67 is the same for both (or all) camera modules 20*a* and 20*b*, that is, it is a shared address, for example 0x30. More generally, peripheral devices of a given type may share the address of the second control interface. By using this shared address host 22 may, for example, command both camera modules 20*a* and 20*b* to start streaming for 3D image capture at the same time. Start of streaming will start the exposure of the image. The CCI address of the second control interface 67 may be configurable.

Figure 3B:
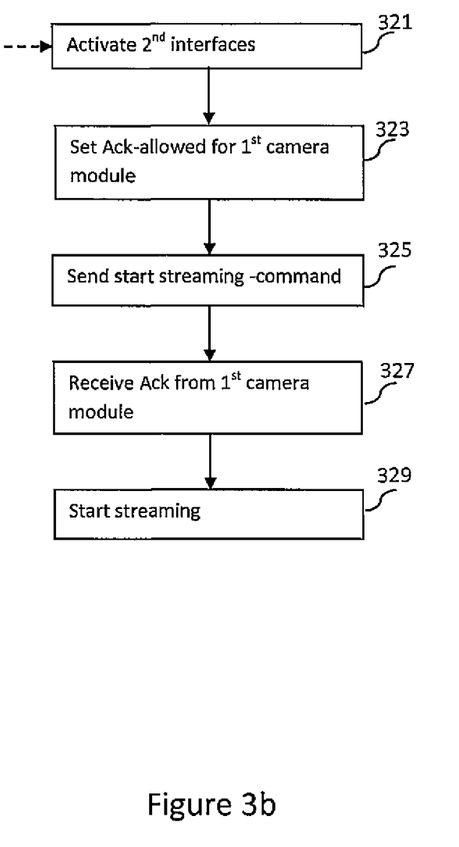
FIG. 3b illustrates an example method for operating second control interfaces of peripheral devices.

FIG. 3*b* shows an example method for operating the second control interfaces 67 of camera modules 20*a* and 20*b*. First, in block 321, second interfaces 67 are activated. The activation may be performed by using the unique address of the first control interface 66. For example, for the first camera module 20*a* the host uses address 0x22 to write to a register, such as 2nd_CCI_if control register. Depending on implementation, for example, the first bit on 2nd_CCI_if control register may be set to enable the second interface 67. Initially the second interface 67 may be not enabled, that is the first bit on 2nd_CCI_if_control register has a value of '0' by default upon power-up. The second interface 67 of the second camera module 20*b* is then activated by using its unique address, in this example 0x20, to write its 2nd_CCI_if control register. If there are further camera modules 26 connected, also their second interfaces 67 may be activated in a similar manner.

A slave device, in the examples described above a camera module, may be expected to acknowledge receipt of a command from a master, in this case a host device, by transmitting an ACK signal. The ACK signal may be generated for example by pulling a data line low during an acknowledge clock pulse generated by the master. In case a slave device needs to signal non-acknowledge (NACK) to the master, it leaves the data line high. In case of a group command that is sent to both (or all) camera modules 20*a* and 20*b*, both (or all) of them would give ACK. In case of one camera module is giving ACK and one or more camera modules are giving NACK, the NACK is not visible to the bus master. This is not desired behavior as only one camera module behaving properly can hide the NACK of even several camera modules. A more predictable behavior of a system may be achieved if only one camera module can give ACK. A camera module that can give ACK should also be able to give NACK. Therefore, only one camera module should be able to acknowledge or not-acknowledge group commands. In block 323 host 22 may be configured to write to one camera module's control register to enable acknowledgement. In this example the first camera module 20*a* is allowed to send ACK signals. The host 22 uses the unique address, for example 0x22, of the first camera module 20*a* to access 2nd_CCI_if control register of the first camera module 20*a*. It may set the second bit, for example, on 2nd_CCI_if control to indicate that the first camera module 20*a* is allowed to send ACK signals to acknowledge group commands. By default this bit may be set to '0' in both (or all) camera modules 2nd_CCI_if control register, that is the default setting may be "send ACK not allowed" in all peripheral devices.

It is also possible to set both first and second bit of the 2nd_CCI_if control register of the first camera module 20*a* to indicate that the second interface 67 is enabled and send ACK is allowed, respectively, before activating the second interface 67 of the second (and subsequent) camera module 20*b*. That is, blocks 321 and 323 of FIG. 3*b* do not have to be performed as separate ordered steps in the illustrated order. Further, the bits in 2nd_CCI_if control register may be defined differently than described above. For example, a bit value '0' may indicate that interface is enabled and/or send ACK is allowed, and other than first two bits of the register may be allocated for this purpose. Also, a value range may be employed rather than individual bits.

After second interfaces 67 of camera modules 20*a* and 20*b* have been activated and only one camera module has been configured to be allowed to send ACK, host 22 may be configured to send a start streaming command to both (or all) camera modules 20*a* and 20*b* as illustrated by block 325. The meaning of the start streaming command may be the same as start exposure. The host 22 may send a start streaming command as a group command to second interfaces 67 of both (or all) camera modules 20*a* and 20*b* using the shared address (0x30).

In block 327, both (or all) camera modules check the second bit of 2nd_CCI_if control register and the one which has a bit value in its register indicating that it is allowed to send ACK, in this example the first camera module 20*a* and bit value '1', sends ACK to acknowledge the group command. Finally, in block 329 both (or all) camera modules start streaming immediately or after a fixed delay, substantially at the same time.

Figure 4:
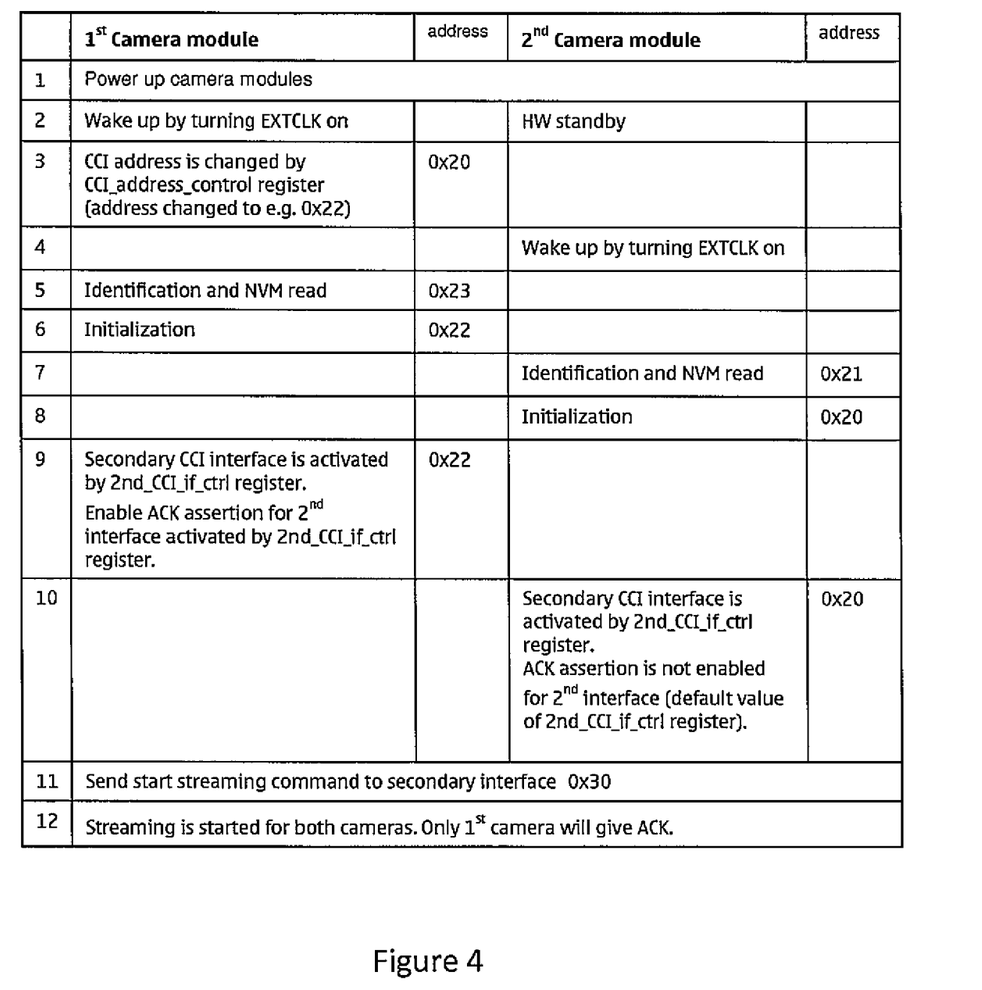
FIG. 4 shows an example command flow regarding the methods illustrated in FIGS. 3a and 3b.

FIG. 4 shows an example command flow regarding the methods illustrated in FIGS. 3*a* and 3*b* for two camera modules 20*a*, 1$^{st}$ Camera, and 20*b*, 2$^{nd}$ Camera. Phases 1 to 8 correspond to the method of FIG. 3*a* and phases 9 to 12 correspond to the method of FIG. 3*b*. Some of the steps may be optional as described in relation to FIGS. 3*a* and 3*b*.

It is noted, that for realizing the example embodiment shown in FIG. 3*b*, the method of FIG. 3*a* or phases 1 to 8 of FIG. 4 are not necessarily required. The unique addresses of the first control interfaces 66 may be given by using some other suitable method. For example the camera modules 20*a* and 20*b* may be uniquely addressed by default so that there is no need to change initial addresses. This could be implemented for example by having camera modules with unique address value programmed to the device memory or camera module's CCI address may be changed by programming different CCI address to each camera module already in a manufacturing phase. Having camera modules with unique default addresses may, however, result in more difficult logistics or product assembly. Alternatively, a unique address may be selected from a plurality of preselectable addresses, for example by pulling a pin to high or low. This pin may be hardwired inside a camera module and controllable by some general purpose I/O (GPIO) pin outside the camera module. This solution, however, uses additional connections and is thus not preferred but remains suitable for practising the invention according to some embodiments.

The initial addresses may also be changed by using other methods than the one shown in FIG. 3*a*. For example, the camera modules 20*a* and 20*b* may be activated by using some other signal than the reference clock signal EXTCLK. If the camera module has an input for a dedicated enable/disable signal, e.g. XSHUTDOWN, the camera module may be activated by driving that signal high (or low, depending on an implementation).

The start streaming-command is not the only time critical command to which the method of FIG. 3*b* may be applied. As another example, the usage of grouped parameter hold is described next. By using group parameter hold-command, it is possible to delay a camera module to taking new settings into use. In other words, it is possible to send new commands or settings to the camera module but those command or settings are not taken into use immediately. The settings or commands are taken into use when grouped parameter hold is set to a released state, that is the host issues a release group parameter hold-command. At that moment new settings/commands are taken into use either immediately or afterwards. For example, the settings may be delayed until next image frame boundary. In some embodiments the data stream from the camera modules continues uninterrupted during the delay.

Figure 5A:
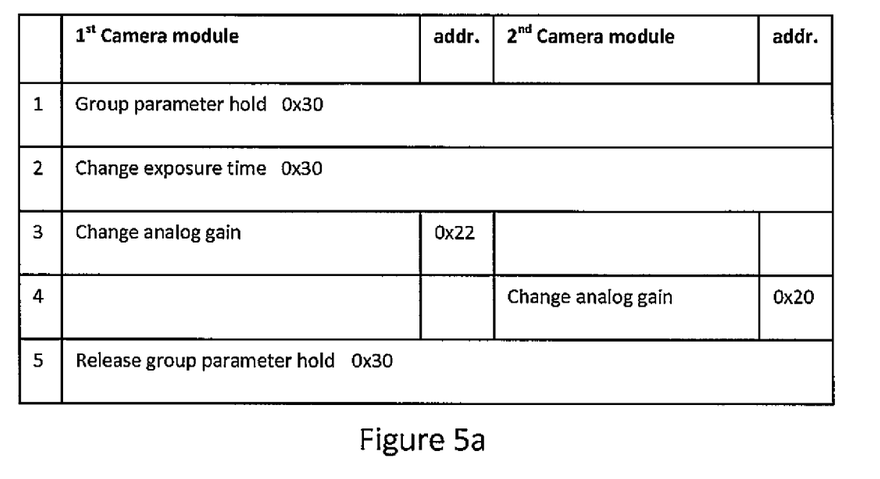
FIG. 5a shows a first example command flow for changing exposure parameters of camera modules.

FIG. 5a shows a first example command flow for changing exposure parameters. In a first phase, the group parameter hold-command is issued by the host 22. This command is addressed with the shared address (e.g. 0x30) and thus received via the second interface 67 of both camera modules 20a and 20b at the same time. The camera modules may responsively delay taking new commands and settings into use. Next, a change exposure time-command may be sent to the shared address. Both camera modules 20a and 20b receive this command at the same time, and as a response exposure time of both camera modules 20a and 20b is to be changed in accordance with the command. In phase 3, the host 22 may send a change analog gain-command to the unique address (0x22 in this example) of the first camera module 20a that receives it via the first interface 66. As a response, an analog gain parameter of the first camera module 20a may to be changed. In the next phase host 22 sends a change analog gain-command to the unique address (0x20 in this example) of the second camera module 20b that receives it via the first interface 66. As a response, an analog gain parameter of the second camera module 20b may to be changed. In the last phase of FIG. 5a, a release group parameter hold-command is issued to the shared address, and thus received via the second interface 67 of both camera modules 20a and 20b. As a result, both camera modules 20a and 20b will take into use earlier loaded exposure time and analog gain values and thus both cameras will use the same exposure time and a camera module specific gain for the next frame. That is, both the exposure time change and the analog gain changes are grouped to happen for the same image frame. In this example a camera pair specific command grouping was used meaning that group parameter hold was used to group and synchronize exposure value change together.

Figure 5B:
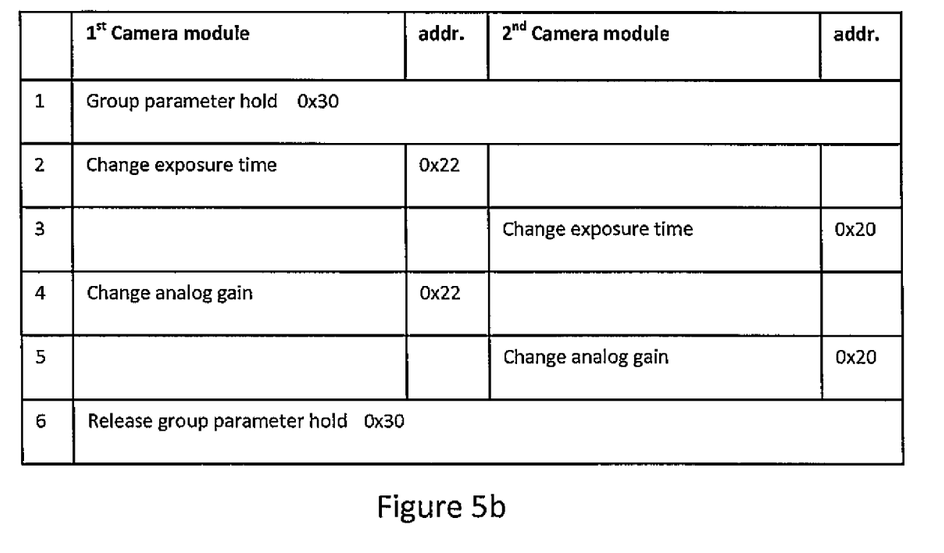
FIG. 5b shows a second example command flow for changing exposure parameters of camera modules.

In the example command flow of FIG. 5b, a camera specific command grouping is used. In a first phase, the group parameter hold-command is issued by the host 22. This command is addressed with the shared address (e.g. 0x30) and thus received via the second interface 67 of both camera modules 20a and 20b at the same time. Next, host 22 issues a change exposure time-command to the first camera module 20a using the unique address (0x22). A change exposure time-command is subsequently issued to the second camera module 20b using its unique address (0x20). A similar procedure is applied to the change analog gain-command. Finally, host 22 issues a release group parameter hold-command to the shared address, and thus it is received via the second interface 67 of both camera modules 20a and 20b. As a result both camera modules 20a and 20b will use camera module specific exposure times and gains for the next image frame. This may be beneficial when capturing images with two cameras with different settings, or more generally with peripheral devices that are configured with unique, as opposed to shared, settings. Depending on used exposure time value, camera modules 20a and 20b may or may not have the same exposure time. In both cases parameters changes are grouped together to happen at same time or virtually at the same time. If in above sequence a group hold-command would have been sent to unique addresses of camera modules 20a and 20b, the camera operations of first and second camera modules would have been totally independent from each other. This may be advantageous in some use cases where camera modules do not need to be synchronized to each other. In other words, according to the example embodiment of the invention camera modules may also be used independently.

As another example, an autofocus (AF) of two camera modules may be synchronized by exploiting a second interface according to example embodiments of the invention. In the following an example operation flow to synchronize the autofocus of two camera modules 20a and 20b applied at the same time is described. This example covers AF synchronization during streaming, that is synchronous AF with grouped parameter hold. In synchronous AF mode, lens movement may be synchronized to the image frame timings. In this example in addition two camera modules are also synchronized together. First, the group parameter hold-command is issued by the host 22. This command is addressed with the shared address (e.g. 0x30) and thus received via the second interface 67 of both camera modules 20a and 20b at the same time. Then, camera module specific AF parameters may be set using unique addresses of camera modules. That is, the host issues change AF parameters-command or commands to the first camera module 20a using its unique address, for example 0x22. A change AF parameters-command or commands are subsequently issued to the second camera module 20b using its unique address, for example 0x20. These commands are received by the camera modules 20a and 20b via first interfaces 66. In a next phase, an AF trigger-command may be issued by host 22 to both camera modules 20a and 20b via second interfaces 67 to start AF strobe generation based on AF parameters, which will start lens movement after releasing group parameter hold. That is, AF trigger-command may be addressed with a shared address, for example 0x30. Finally, a release group parameter hold-command is issued by host 22 to the shared address (0x30), and received via the second interface 67 by both camera modules 20a and 20b.

An alternative AF synchronization is synchronous AF without grouped parameter hold. Also in this example lens movement may be synchronized to the image frame timings. In this example in addition two camera modules are also synchronized together In this case, camera module specific AF parameters may be set using unique addresses of camera modules 20a and 20b (e.g. 0x22 and 0x20, respectively) in the first phase. That is, a change AF parameters-command or commands are received by camera modules 20a and 20b via their first interfaces 66. In a second phase, AF trigger-command is issued by host 22 to both camera modules 20a and 20b via second interfaces 67 to start AF strobe generation that starts lens movement. That is, AF trigger-command is addressed with a shared address, for example 0x30. Still another alternative is asynchronous AF that happens simultaneously with grouped parameter hold. In asynchronous AF mode, AF may not be synchronized to image frame timings, but the camera modules are synchronized to each other. In this example, a group parameter hold-command is issued by host 22 and addressed with a shared address (e.g. 0x30) and thus received by both camera modules 20a and 20b via second interfaces 67. Next, camera module specific AF parameters may be set using unique addresses of camera modules 20a and 20b (e.g. 0x22 and 0x20, respectively), that is sending a change AF parameters-command successively to camera modules 20a and 20b via first interfaces 66. In asynchronous mode, changing AF parameters will start lens movements after releasing group parameter hold. Finally, a release group parameter hold-command is issued by host 22 to the shared address (0x30), and received via the second interface 67 by both camera modules 20a and 20b.

Command flow FIGS. 5a and 5b show only commands issued by host device 22. However, each command sent by a master (for example host 22) may be acknowledged by the receiving slave(s) (the camera modules 20a and 20b). In FIGS. 5a and 5b these ACK signals sent by the camera modules 20a and 20b are omitted for simplicity.

Figure 6:
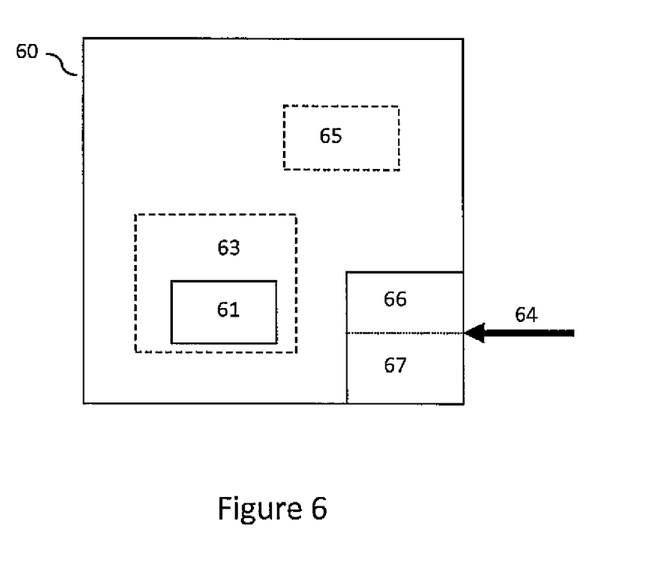
FIG. 6 shows an example of an apparatus according to an embodiment of the invention.

FIG. 6 shows an apparatus 60 having the first interface 66 that is addressable by a unique address and the second interface 67 that is addressable by a shared address. The addressed commands issued by the host device 22 (not shown in FIG. 6) are received via interfaces 66 and 67, depending on the address, from a bus 64 that may be for example an I²C-bus or some other I²C compatible bus. The apparatus 60 further comprises registers 61 for storing control parameters. The registers 61 may comprise for example CCI_address_control register and 2nd_CCI_if control register. Control parameters may comprise inter alia interface address parameters, interface enable/disable parameters and an acknowledge parameter indicating whether the apparatus is allowed to send the ACK signal or not. The apparatus 60 may also comprise a processor 65 and a memory 63 for storing e.g. image data. The memory 63 may also be used to store device settings and registers; the registers 61 may be located in the memory 63. The memory 63 may further comprise software program instructions executable by the processor 65. The processor 65, the memory 63, the registers 61, and the control interfaces 66 and 67 are communicatively connected to each other. Processor 65 may be configured, with the software program instructions stored in memory 63, to cause the apparatus to perform processes connected with embodiments of the present invention. Alternatively, a processor 65 and a memory for storing image data may be located in a host device 22 to which the apparatus 60 is communicatively connected via the bus 64. In this case, a memory 63 inside the apparatus 60 comprises one or more registers 61.

The apparatus 60 may be a camera module. If the apparatus is a camera module, it may further comprise a reference clock signal input and/or enable/disable signal input, and a data transfer interface with data and clock(/strobe) outputs as shown in FIG. 1.

Although the example embodiments of the invention has been described in relation to camera modules it is noted that the invention is not limited to them but may be applied also to any I²C compatible peripheral devices if unique and shared addressing is required.

Without in any way limiting the scope, interpretation, or application of the claims appearing below, a technical effect of one or more of the example embodiments disclosed herein is that peripheral devices can receive individual commands via one interface and group commands via another interface thus eliminating the need to implement two separate control buses. Another technical effect of one or more of the example embodiments disclosed herein is that two peripheral devices with identical initial addresses can be connected to a bus that by definition requires unique addressing.

Embodiments of the present invention may be implemented in software, hardware, application logic or a combination of software, hardware and application logic. The software, application logic and/or hardware may reside on a peripheral device or on a memory, a microprocessor or a central processing unit of the peripheral device. If desired, part of the software, application logic and/or hardware may reside on a host device or on a memory, a microprocessor or a central processing unit of the host. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 6. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   receiving a first command via a first interface addressable via a first address; and
   receiving a second different command via a second interface addressable via a second address, wherein the second address comprises a shared address, where the first interface and the second interface both are associated with a first peripheral device.

2. A method of claim 1, further comprising:
   receiving a clock signal at a clock input, wherein the first address is received responsive to the clock signal.

3. A method of claim 2, wherein the clock input is separate from the first interface and the second interface.

4. A method of claim 1, further comprising receiving via the first interface a unique address to replace the first address.

5. A method of claim 1, wherein a second peripheral device is addressable via the shared address, where the first peripheral device and the second peripheral device are connected to a same bus, and where the second peripheral device is of a same or substantially same type as the first peripheral device.

6. A method of claim 1 further comprising:
   storing an indication indicating whether the first peripheral device is an acknowledging peripheral device, and where the first peripheral device is an acknowledging peripheral device, sending an acknowledge signal in response to a group command received via the second interface.

7. A method of claim 6, wherein the group command is received at a same or substantially same time at least via the second interface associated with the first peripheral device and via a second peripheral device, of a same or substantially same type as the first peripheral device, connected to a same bus.

8. A method of claim 1, wherein the first interface is configured to receive individual commands, and the second interface is configured to receive group commands.

9. A method of claim 1, wherein the first interface and the second interface are camera control interfaces.

10. An apparatus comprising:
at least one processor; and
at least one non-transitory memory including computer program code;
the at least one non-transitory memory and the computer program code configured to, with the at least one processor, cause the apparatus at least to perform:
receive a first command via a first interface addressable via a first address;
receive a second different command via a second interface addressable via a second address, where the first interface and the second interface both are associated with the apparatus; and
receive via the first interface a unique address to replace the first address.

11. The apparatus of claim 10, wherein the apparatus is further caused to perform:
receive a clock signal at a clock input, wherein the first address is received responsive to the clock signal.

12. The apparatus of claim 11, wherein the clock input is separate from the first interface and the second interface.

13. An apparatus comprising:
at least one processor; and
at least one non-transitory memory including computer program code;
the at least one non-transitory memory and the computer program code configured to, with the at least one processor, cause the apparatus at least to perform:
receive a first command via a first interface addressable via a first address; and
receive a second different command via a second interface addressable via a second address, where the first interface and the second interface both are associated with the apparatus, wherein the second address comprises a shared address.

14. The apparatus of claim 13, wherein a peripheral device is addressable via the shared address, where the apparatus and the peripheral device are connected to a same bus, and where the peripheral device is of a same or substantially same type as the apparatus.

15. The apparatus of claim 10, wherein the apparatus is further caused to perform:
store an indication indicating whether the apparatus is an acknowledging peripheral device, and
where the apparatus is an acknowledging peripheral device, send an acknowledge signal in response to a group command received via the second interface.

16. The apparatus of claim 15, wherein the group command is received at a same or substantially same time at least via the second interface associated with the apparatus and via a peripheral device, of a same or substantially same type as the apparatus, connected to a same bus.

17. An apparatus comprising:
at least one processor; and
at least one non-transitory memory including computer program code;
the at least one non-transitory memory and the computer program code configured to, with the at least one processor, cause the apparatus at least to perform:
receive a first command via a first interface addressable via a first address; and
receive a second different command via a second interface addressable via a second address, where the first interface and the second interface both are associated with the apparatus, wherein the first interface is configured to receive individual commands, and the second interface is configured to receive group commands.

18. The apparatus of claim 10, wherein the first interface and the second interface are camera control interfaces.

19. A system comprising:
a host device; and
at least two peripheral devices, where the at least two peripheral devices respectively comprise two different interfaces, the respective two different interfaces separately addressable via a respective different address using the host device, wherein one interface of the respective two different interfaces is separately addressable via a shared address.

20. The apparatus of claim 10, wherein the apparatus comprises at least two camera modules.

21. The apparatus of claim 20, wherein the individual commands and the group commands are configured to enable management of camera parameters of the at least two camera modules.

22. The apparatus of claim 21, wherein the camera parameters comprise one or more of exposure parameters, autofocus parameters, or analog gain parameters.

23. A method comprising:
receiving a first command via a first interface addressable via a first address; and
receiving a second different command via a second interface addressable via a second address, wherein the second address comprises a shared address, where the first interface and the second interface both are associated with a first apparatus.

24. An electronic device comprising:
at least one processor; and
at least one non-transitory memory including computer program code;
the at least one non-transitory memory and the computer program code configured to, with the at least one processor, cause the apparatus at least to perform:
enable an apparatus to:
receive a first command via a first interface addressable via a first address; and
receive a second different command via a second interface addressable via a second address, wherein the second address comprises a shared address, where the first interface and the second interface both are associated with the apparatus.

25. The apparatus of claim 14, wherein the apparatus comprises the peripheral device.

26. A method comprising:
receiving a first command via a first interface addressable via a first address;
receiving a second different command via a second interface addressable via a second address, where the first interface and the second interface both are associated with a first peripheral device; and
receiving via the first interface a unique address to replace the first address.

27. A method comprising:
receiving a first command via a first interface addressable via a first address; and
receiving a second different command via a second interface addressable via a second address, where the first interface and the second interface both are associated with a first peripheral device, wherein the first interface is configured to receive individual commands, and the second interface is configured to receive group commands.

* * * * *